(12) United States Patent
Saville et al.

(10) Patent No.: US 8,376,690 B2
(45) Date of Patent: Feb. 19, 2013

(54) THREE BEARING FLEXIBLE SHAFT FOR HIGH SPEED TURBOMACHINERY

(75) Inventors: Marshall Saville, Torrance, CA (US); David G. Elpern, Los Angeles, CA (US)

(73) Assignee: Honeywell International Inc., Morristown, NJ (US)

( * ) Notice: Subject to any disclaimer, the term of this patent is extended or adjusted under 35 U.S.C. 154(b) by 458 days.

(21) Appl. No.: 12/633,591

(22) Filed: Dec. 8, 2009

(65) Prior Publication Data

US 2011/0135463 A1 Jun. 9, 2011

(51) Int. Cl.
*F01D 15/08* (2006.01)

(52) U.S. Cl. .................... 415/124.2; 415/60; 415/216.1; 416/244 A (58) Field of Classification Search .............. 415/124.2, 415/216.1, 60; 416/224 A, 124
See application file for complete search history.

(56) References Cited

U.S. PATENT DOCUMENTS

| | | | |
|---|---|---|---|
| 5,113,670 A | 5/1992 | McAuliffe et al. | |
| 5,224,842 A | 7/1993 | Dziorny et al. | |
| 5,249,934 A | 10/1993 | Merritt et al. | |
| 5,309,735 A * | 5/1994 | Maher et al. | 62/402 |
| 5,697,848 A * | 12/1997 | Bosley | 464/98 |
| 5,964,663 A * | 10/1999 | Stewart et al. | 464/98 |
| 6,037,687 A | 3/2000 | Stewart et al. | |
| 6,094,799 A * | 8/2000 | Stewart et al. | 29/525 |
| 6,151,909 A * | 11/2000 | Carter et al. | 62/402 |
| 6,672,966 B2 * | 1/2004 | Muju et al. | 464/157 |
| 2008/0124168 A1* | 5/2008 | Lescure et al. | 403/359.1 |

FOREIGN PATENT DOCUMENTS

| EP | 664856 B1 | 4/1996 |
|---|---|---|
| JP | 2004/245193 | 9/2004 |

* cited by examiner

*Primary Examiner* — Ninh H Nguyen
*Assistant Examiner* — William Grigos
(74) *Attorney, Agent, or Firm* — Shimokaji & Assoc., PC (57) ABSTRACT

A three journal bearing supported shaft with a link between two of the bearings may allow for longer spacing between the wheels supported by the shaft. The flexible shaft may move one bending critical speed below the minimum operating speed of the shaft and the next bending critical speed above the maximum operating speed of the shaft, thus extending the speed range significantly. A tie rod may be used as the link in the shaft.

12 Claims, 8 Drawing Sheets

THREE BEARING FLEXIBLE SHAFT FOR HIGH SPEED TURBOMACHINERY

BACKGROUND OF THE INVENTION

The present invention relates to a three bearing flexible shaft for high speed turbomachinery and, more particularly, a three bearing flexible shaft that improves turbomachine efficiency while mitigating rotor critical speeds.

Conventional aircraft environmental control systems incorporate an air cycle machine, also referred to as an air cycle cooling machine, for use in cooling and dehumidifying air for supply to the aircraft cabin for occupant comfort. Typically, such air cycle machines are three wheel machines comprised of a compressor, a turbine, and a fan disposed at axially spaced intervals along a common shaft, the turbine driving both the compressor and the fan. The three wheels are supported for rotation about the axis of the shaft on one or more bearing assemblies disposed about the drive shaft, such as a pair of spaced bearing assemblies, one bearing assembly disposed intermediate each pair of adjacent spaced wheels. Although the bearing assemblies may be ball bearings or the like, hydrodynamic film bearings, such as gas film foil bearings, are often utilized on air cycle machines.

On aircraft powered by turbine engines, the air to be conditioned in the air cycle machine is typically compressed air bled from one or more of the compressor stages of the turbine engine. In conventional systems, this bleed air is passed through the air cycle machine compressor wherein it is further compressed, thence passed through a condensing heat exchanger to cool the compressed air sufficiently to condense moisture therefrom thereby dehumidifying the air before expanding the dehumidified compressed air in the turbine of the air cycle machine to both extract energy from the compressed air so as to drive the shaft and also to cool the expanded turbine exhaust air for use as the cooling fluid in the aforementioned condensing heat exchanger before it is supplied to the cabin as conditioned cooling air. The compressed bleed air being supplied to the compressor of the air cycle machine is typically precooled by passing it through a precooling heat exchanger in heat exchange relationship with ambient air drawn through the precooling heat exchanger by the fan of the air cycle machine.

Although conventional three wheel air cycle machines are satisfactory for use in such conventional environmental control systems, such three wheel air cycle machines are not suitable for use in the aircraft environmental control system disclosed in U.S. Pat. No. 5,086,622, wherein the expanded and cooled turbine exhaust air which has passed as the cooling fluid in heat exchange relationship with the compressed air passing through the condensing heat exchanger is, after discharge from the cooling fluid path of the condensing heat exchanger, expanded in a second turbine to cool the expanded air to a desired temperature for supply to the cabin as conditioned cooling air and to extract further energy therefrom. To be suitable for use in this improved aircraft air conditioning system, an air cycle machine must have four wheels, i.e. two turbines, a compressor and a fan.

Figure 1:
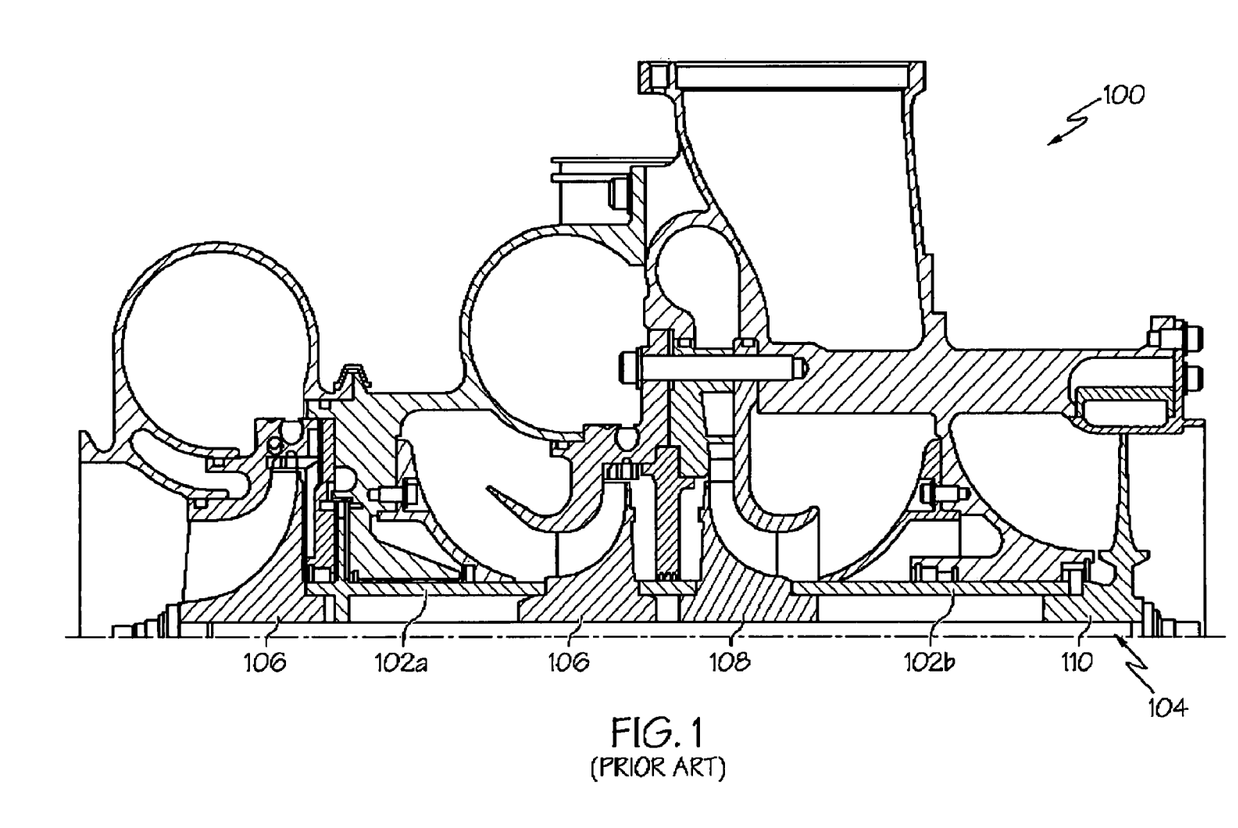
FIG. 1 is a partial cross-sectional drawing of an air cycle machine according to the prior art.

Referring to FIG. 1, four wheel air cycle machines 100 currently use journal bearings 102a, 102b to support a rotating assembly 104. This structure may minimize the spacing between the wheels (such as turbines 106, compressor 108 and fan 110) in order to prevent bending critical speeds from being in the operating speed range. This limitation in the spacing between the wheels, however, may result in suboptimal fan and/or compressor aerodynamic efficiency.

As can be seen, there is a need for a four wheel air cycle machine design that may allow for improved aerodynamic efficiency while mitigating the bending critical speeds from the operating speed range.

SUMMARY OF THE INVENTION

In one aspect of the present invention, a three-bearing-supported shaft comprises a first shaft member; a second shaft member; and a link connecting the first rigid shaft member with the second rigid shaft member, wherein the link is located between two of the three bearings supporting the shaft, and wherein the link has a flexibility greater than that of the first and second shaft members.

In another aspect of the present invention, a turbomachine comprises a fan, compressor and first and second turbines positioned sequentially along a shaft; a first bearing positioned between the fan and the compressor; a second bearing positioned between the compressor and the first turbine; a third bearing positioned between the first turbine and the second turbine; and a link in the shaft, the link positioned either between the first bearing and the second bearing or between the second bearing and the third bearing, wherein the link has a flexibility greater than that of the shaft.

In a further aspect of the present invention, a method for mitigating critical speeds of a shaft of a turbomachine comprises supporting the shaft with a first bearing, a second bearing and a third bearing, wherein the shaft includes a tie-rod positioned between two of the bearings; and adjusting a diameter and a length of the link to move bending critical speeds of the turbomachine outside the operating speed range of the turbomachine.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a three journal bearing supported shaft with a flexible link between two of the bearings. The three journal bearing support may allow for longer spacing between wheels. The flexible link may move one bending critical speed below the minimum operating speed of the shaft while keeping the next bending critical speed above the maximum operating speed of the shaft, thus extending the speed range significantly. Typically, high speed rotating machinery rotor assemblies are typically held together by a tie rod. According to one embodiment of the present invention, a tie rod may be used as the flexible link in the shaft.

As used herein, the term "flexible", as it refers to a flexible link, is a relative term referring to a link connecting two shafts, wherein the flexible link may have a greater propensity for bending than the shaft itself. A "flexible link" may be flexible enough to lower a bending critical speed below the operating speed of a rotating machine. The flexibility of a flexible link may be adjusted, according to an exemplary embodiment of the invention, by adjusting the length and diameter of the flexible link. In an exemplary embodiment, the flexible link may be a tie rod joining two separate shaft members.

As used herein, the term "rigid", as it refers to a rigid shaft, is a relative term referring to a shaft that has either no flexibility or a flexibility less that that of a flexible link, as defined above.

Figure 2:
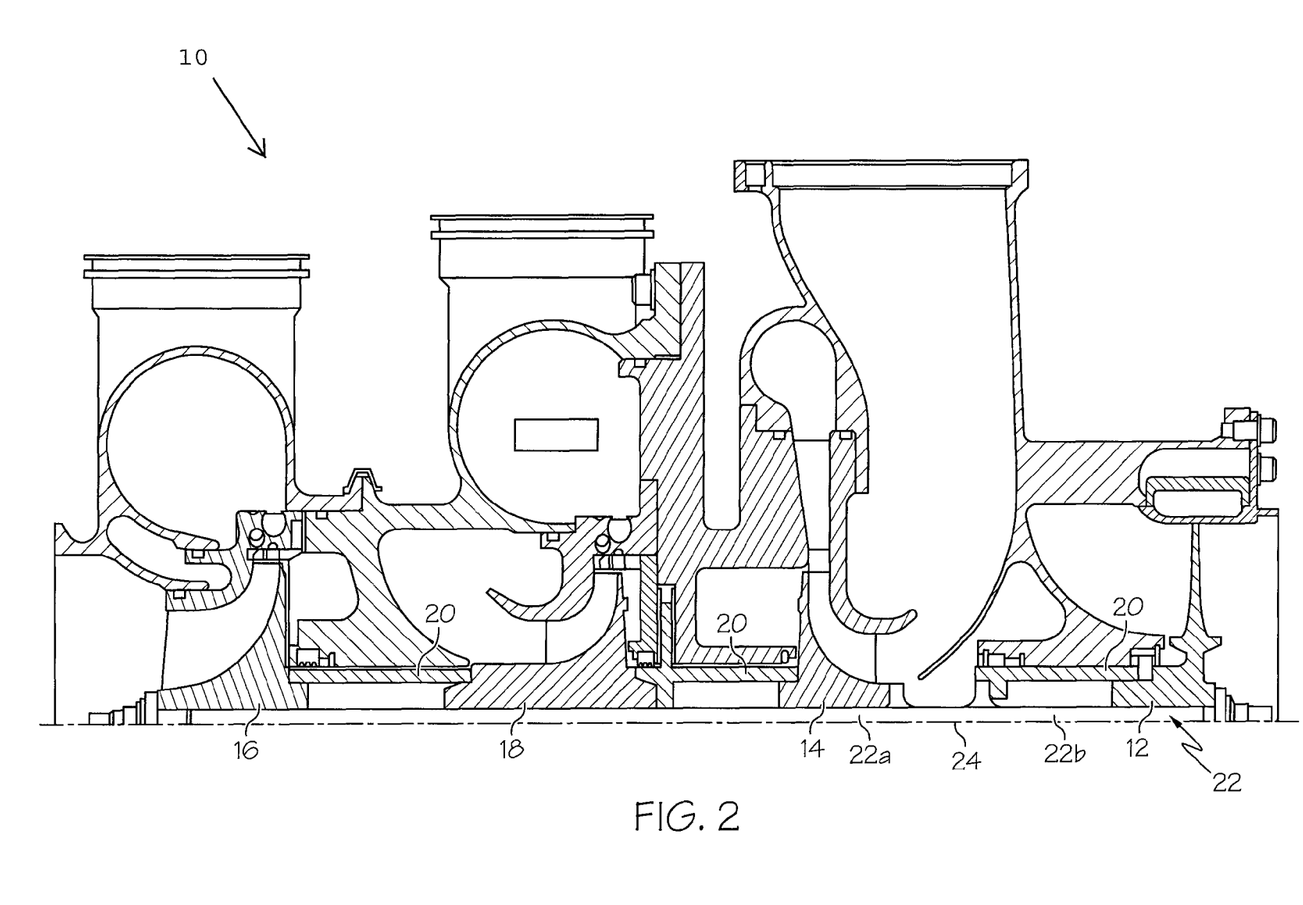
FIG. 2 is a partial cross-sectional drawing of an air cycle machine according to an embodiment of the present invention.

Referring to FIG. 2, there is shown a cross-sectional drawing of a portion of an air cycle machine 10 according to one embodiment of the present invention. The air cycle machine 10 may include, as rotating components, a fan 12, a compressor 14 and first and second turbines 16, 18. The air cycle machine 10 may include bearings, such as journal bearings 20 in between the rotating components. The rotating components may be mounted on a shaft 22. At least a portion of the shaft 22 includes a flexible link 24. The flexible link 24 may be, for example, a tie rod joining together a first section 22a and a second section 22b of the shaft 22. According to one embodiment of the present invention, as shown in FIG. 2, the flexible link 24 may be positioned between the fan 12 and the compressor 14. In an exemplary embodiment of the present invention, the link 24 may be a flexible link made of stainless steel, such as 15-5 PH stainless steel.

Figure 3:
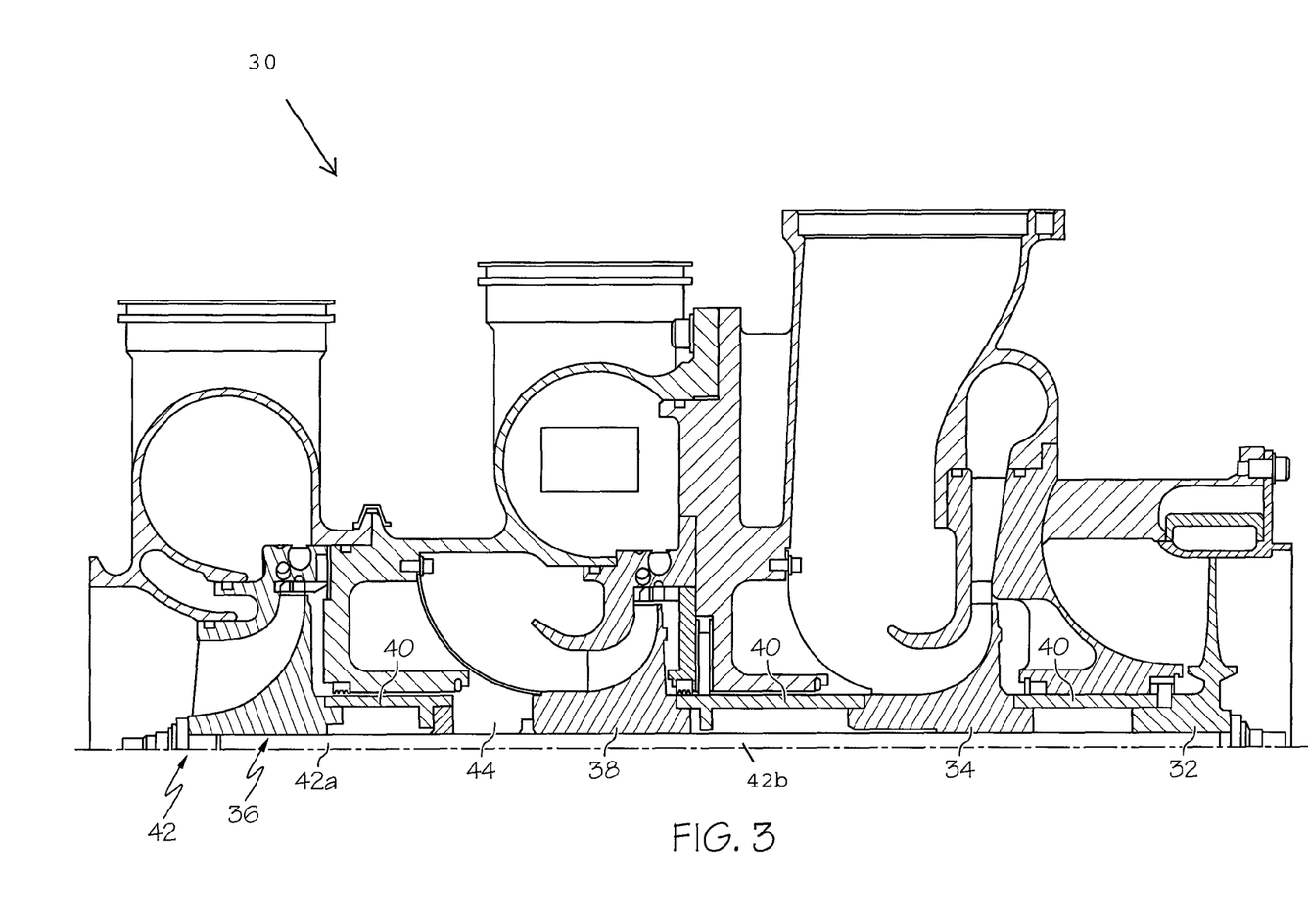
FIG. 3 is a partial cross-sectional drawing of an air cycle machine according to another embodiment of the present invention.

Referring now to FIG. 3, there is shown a cross-sectional drawing of a portion of an air cycle machine 30 according to another embodiment of the present invention. Similar to the embodiment of FIG. 2, the air cycle machine 30 may include as rotating components, a fan 32, a compressor 34 and first and second turbines 36, 38. The air cycle machine 30 may include bearings, such as journal bearings 40 in between the rotating components. The rotating components may be mounted on a shaft 42. At least a portion of the shaft 42 includes a flexible link 44. The flexible link 44 may be, for example, a tie rod joining together a first section 42a and a second section 42b of the shaft 42. According to the embodiment of the present invention shown in FIG. 3, the flexible link 44 may be positioned between the turbine 36 and the turbine 38. While the embodiment of FIG. 3 shows the compressor 34 in a reversed airflow configuration (as compared to the compressor 14 of FIG. 2), such a compressor configuration is not critical to the present invention, as any conventional compressor airflow configuration, as is known in the art, may be used with the three bearing flexible shaft as herein described.

EXAMPLE 1

Embodiments of the present invention will be described with reference to the following example. This example is not intended to encompass the complete scope of the present invention, but, instead, describe a particular embodiment embraced by the present invention.

Figure 4:
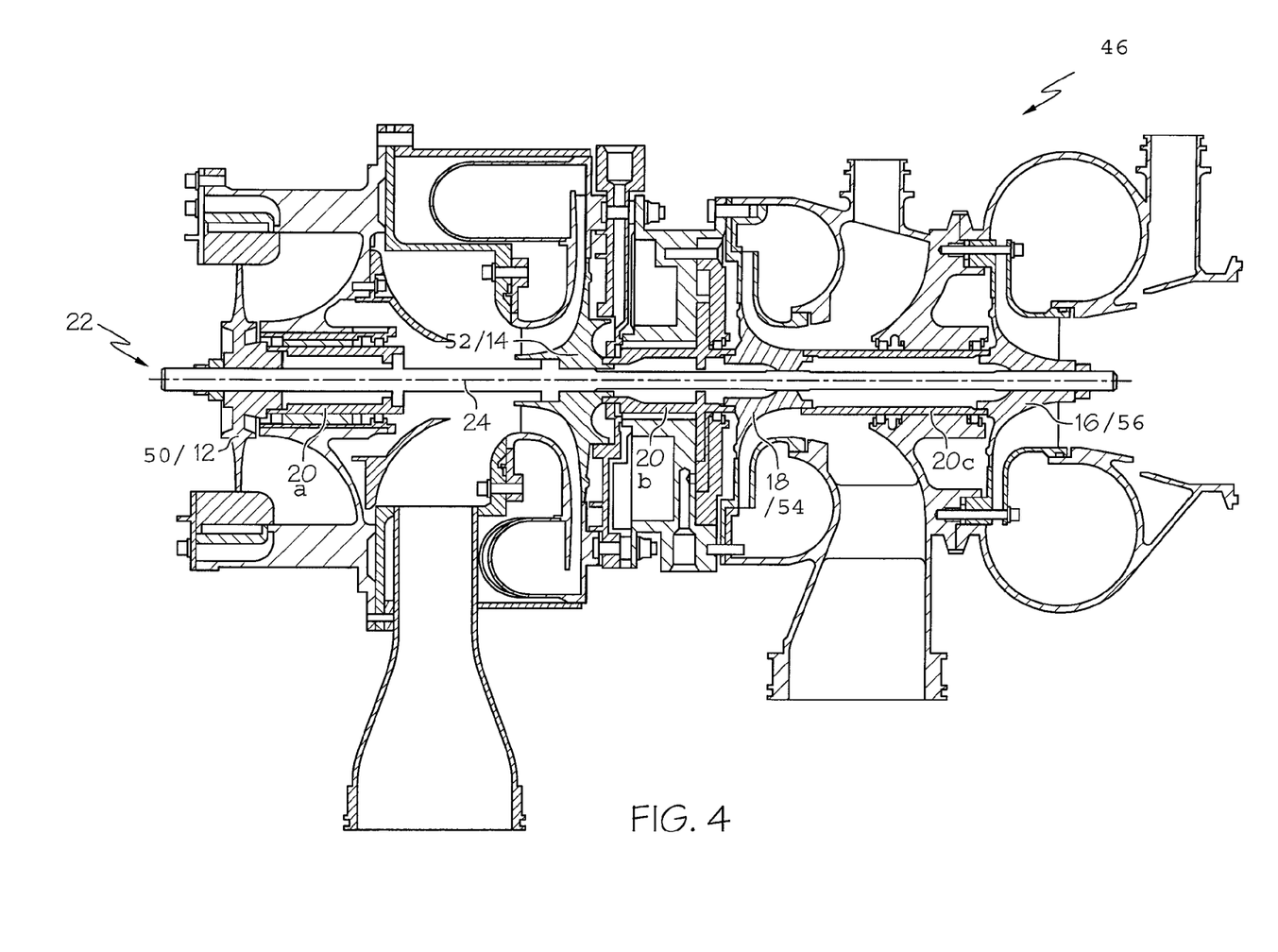
FIG. 4 is a cross-sectional drawing of the air cycle machine of FIG. 2.

Referring to FIG. 4, there is shown a full cross-sectional view of a four-wheel air cycle machine 46 according to one embodiment of the present invention. The air cycle machine 46 of FIG. 4 is similar to the air cycle machine 10 of FIG. 2, viewed from the opposite side. The example below describes the shaft 22 that may be used in the air cycle machine 46 of FIG. 4.

Referring still to FIG. 4, there is shown the shaft 22 of the air cycle machine 46. The shaft 22 may include a first wheel 50 (fan 12), a second wheel 52 (compressor 14), a third wheel 54 (turbine 18) and a fourth wheel 56 (turbine 16). A first bearing 20a may be present between first and second wheels 50, 52. A second bearing 20b may be present between second and third wheels 52, 54. A third bearing 20c may be present between third and fourth wheels 54, 56. This shaft 22 may include a flexible link 24 between the first wheel 50 and the second wheel 52. According to the embodiment of FIG. 4, the fan 12 and the compressor 14 may be made of steel and the turbines 16, 18 may be made of aluminum. The operating speed range of the example of FIG. 4 may be about 60,000 rpm.

Rotor Dynamic Analysis

Figure 5:
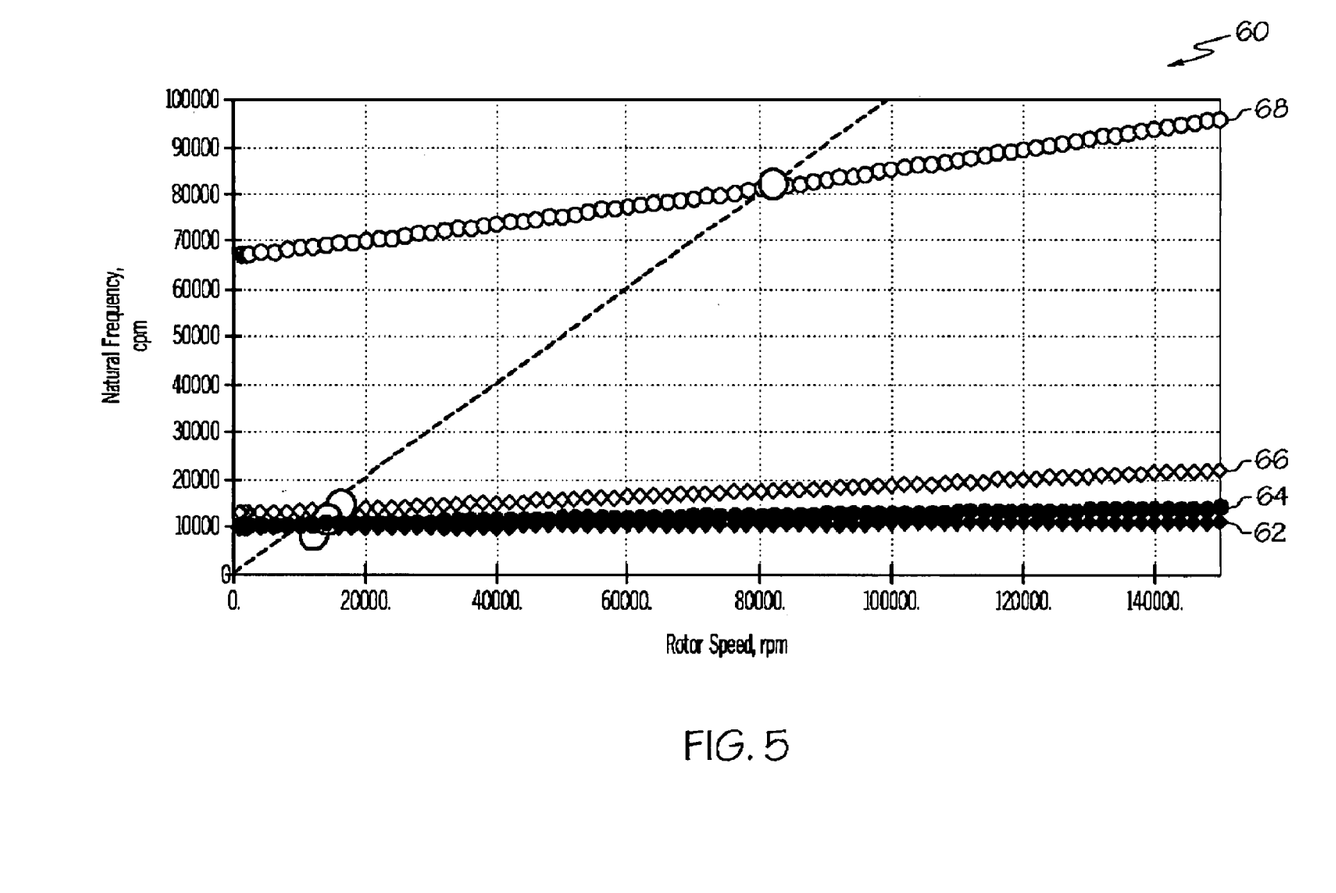
FIG. 5 is a graph of the natural frequency of the rotor of FIG. 5 vs the rotor speed.
Figure 6:
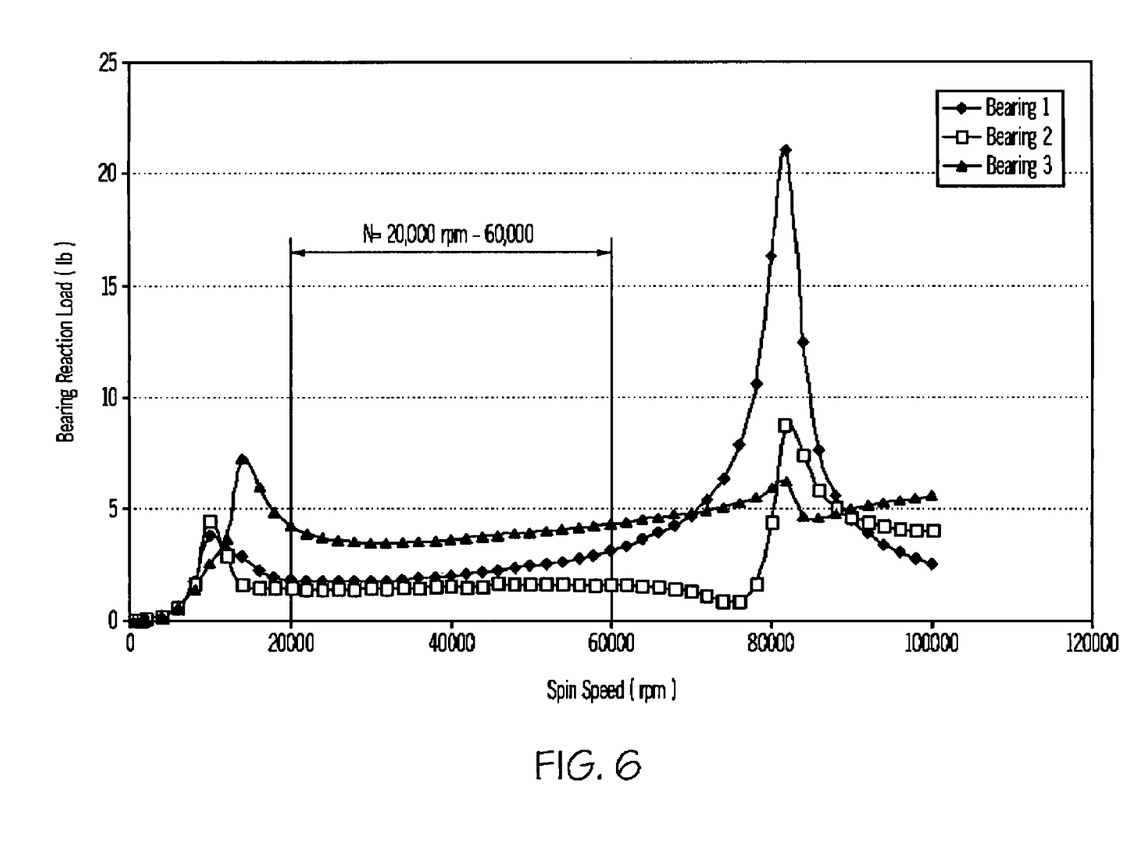
FIG. 6 is a graph of bearing reaction load vs spin speed for the rotor of FIG. 5.

Referring to FIGS. 5 and 6, various results are shown for the Example described with reference to FIG. 4. More specifically, FIG. 5 shows a critical speed map 60 of the shaft 22 of FIG. 4. The natural frequencies of a first, second and third critical speed 62, 64, 66 are shown to be generally less than about 20,000 cpm at the shaft operating speed of about 60,000 rpm. A fourth critical speed 68 is about 80,000 cpm at the shaft operating speed of about 60,000 rpm.

FIG. 6 shows the bearing reaction load vs shaft spin speed. At the operating speed of about 60,000 rpm, the bearing reaction load for each bearing is less than 5 pounds and within the capacity of the journal bearings.

The results described in the above figures show that the rotor dynamics for the shaft described in FIG. 4 should be acceptable for use, with a critical speed being outside of an operating speed range of the air cycle machine.

As can be seen from the above analysis with respect to Example 1, the use of a tie rod as the flexible link 24 in the shaft, as shown in the embodiment of FIG. 4, should meet or exceed all safety and performance criterion. While the above analysis refers to the flexible link 24 being present between the fan and the turbine, the flexible link 24 may be positioned between the two turbines, as shown in FIG. 3. Similar results as those described above should be expected.

Figure 7:
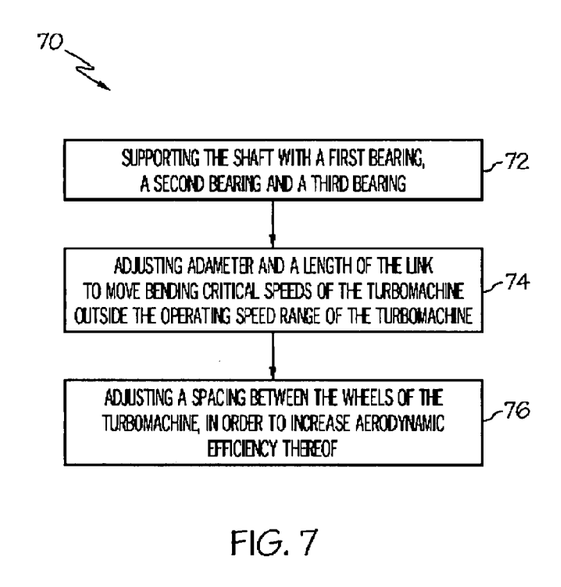
FIG. 7 is a flow chart describing a method according to an embodiment of the present invention.
Figure 8:
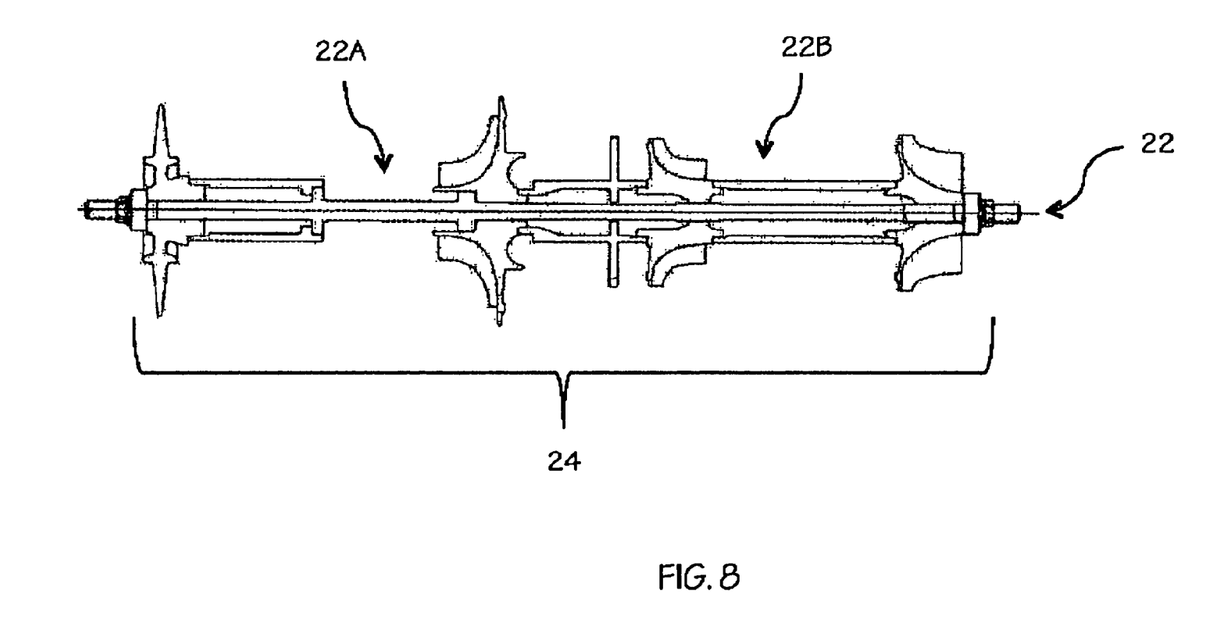
FIG 8 is a drawing of the tie rod assembly of the air cycle machine.

Referring now to FIG. 7, there is shown a flow chart describing a method 70 for mitigating critical speeds of a shaft of a turbomachine according to one embodiment of the present invention. The method 70 may include a step 72 of supporting the shaft with a first bearing, a second bearing and a third bearing. The shaft, as described above, may include a flexible link, such as a tie-rod, positioned between two of the bearings. The method 70 may include a further step 74 of adjusting a diameter and a length of the link to move bending critical speeds of the turbomachine outside the operating speed range of the turbomachine. According to one embodiment of the present invention, the method 70 may include a step 76 of adjusting a spacing between the wheels of the turbomachine, in order to increase aerodynamic efficiency thereof, while continuing to operate outside of the critical speeds of the turbomachine.

While the analysis above concerns a steel fan, steel compressor, and aluminum turbines, other materials may be used. For example, a titanium or aluminum fan or compressor may achieve results similar to those described above. Other suitable materials, such as stainless steel or nickel alloys, may also be used in embodiments of the present invention.

The above description discusses four wheel air cycle machines. However, embodiments of the present invention may be applied to other motor driven turbomachinery or generators of other devices with multiple components on a single rotating assembly.

It should be understood, of course, that the foregoing relates to exemplary embodiments of the invention and that modifications may be made without departing from the spirit and scope of the invention as set forth in the following claims.

We claim:

1. A three-bearing-supported shaft comprising:
   a first shaft member;
   a second shaft member; and
   a tie rod connecting the first rigid shaft member with the second rigid shaft member, wherein
   the tie rod is located between two of the three bearings supporting the shaft, and wherein
   the tie rod has a greater propensity for bending than that of the first and second shaft members; wherein
   the shaft supports four wheels wherein the four wheels are a fan, a compressor, and two turbines supported by the shaft.

2. The shaft of claim 1, wherein the tie rod is located between the fan and the compressor.

3. The shaft of claim 1, wherein the tie rod is located between the two turbines.

4. The shaft of claim 1, wherein the shaft is a three-bearing-supported shaft of an air cycle machine.

5. A turbomachine comprising:
   a fan, compressor and first and second turbines positioned sequentially along a shaft;
   a first bearing positioned between the fan and the compressor;
   a second bearing positioned between the compressor and the first turbine;
   a third bearing positioned between the first turbine and the second turbine; and
   a tie rod in the shaft, the link positioned either between the first bearing and the second bearing or between the second bearing and the third bearing, wherein the tie rod has a propensity for bending greater than that of the shaft.

6. The turbomachine of claim 5, wherein the turbomachine is an air cycle machine.

7. The turbomachine of claim 5, wherein critical speeds of the shaft are outside of an operating speed of the turbomachine.

8. The turbomachine of claim 5, wherein the tie rod is positioned between the first bearing and the compressor.

9. The turbomachine of claim 5, wherein the tie rod is positioned between the first turbine and the third bearing.

10. A method for mitigating critical speeds of a shaft of a turbomachine, the method comprising:
    positioning a fan, compressor, and first and second turbines along the shaft;
    supporting the shaft with a first bearing, a second bearing and a third bearing, wherein the shaft includes a tie-rod connecting a first rigid shaft member with a second rigid shaft member positioned between two bearings; and
    adjusting a diameter and a length of the tie rod to move bending critical speeds to the turbomachine outside the operating speed range of the turbomachine.

11. The method of claim 10, wherein the turbomachine is a four wheel air cycle machine.

12. The method of claim 11, further comprising adjusting a spacing between the wheels of the turbomachine, in order to improve the inlet or outlet airflow path and thus increase aerodynamic efficiency thereof, while continuing to operate outside of the critical speeds of the turbomachine.

* * * * *